United States Patent Office 3,637,602
Patented Jan. 25, 1972

---

3,637,602
RESINS FROM PHENYLENE BISACRYLIC ACID
Anthony B. Conciatori, Chatham, N.J., assignor to
Celanese Corporation, New York, N.Y.
No Drawing. Filed Nov. 13, 1967, Ser. No. 682,584
Int. Cl. C08g 20/00
U.S. Cl. 260—78          3 Claims

ABSTRACT OF THE DISCLOSURE

An approximately equimolar quantity of an aromatic dicarboxylic acid possessing at least one non-aromatic side chain having a carbon to carbon double bond in conjugation with the aromatic nucleus, or an acid halide derivative thereof, is condensed with a primary or a secondary diamine to form a high melting polyamide resin. The polyamide resin possesses improved performance properties, and is particularly suited for use in the production of fibers, and as a vehicle or binder in the formation of high temperature resistant composite articles.

BACKGROUND OF INVENTION

The invention relates to high melting polyamide resins. More particularly, the invention concerns linear and/or crosslinked polyamide resins of the nylon type, and an efficient process for producing the same.

Since the original nylon (nylon 6,6) was developed in the 1930's by the reaction of adipic acid and hexamethylene diamine, polyamide resins have undergone extensive investigation, and widespread commercialization. As is well known, commercially available polyamides commonly have a molecular weight greater than 10,000 and melt at about 250 to 260° C.

It is an object of the invention to provide polyamide resins which melt at temperatures in excess of the melting point of polyamides commonly available commercially.

It is an object of the invention to provide an efficient process for the production of polyamide resins.

It is an object of the invention to provide polyamide resins of increased insolubility in common solvents.

It is another object of the invention to provide polyamide resins which are capable of forming a cross-linked product upon heating.

It is a further object of the invention to provide high melting polyamide resins which are useful in the production of fibers.

These and other objects, as well as the scope, nature and utilization of the invention will be apparent from the following detailed description and appended claims.

SUMMARY OF INVENTION

It has now been discovered that a process for the production of a high melting polyamide resin comprises condensing approximately equimolar quantities of (1) a coreactant having a molecular configuration comprising at least one aromatic nucleus and symmetrical unsaturated side chains in which the unsaturation is present as a carbon to carbon double bond positioned in conjugation with the aromatic nucleus selected from the group consisting of aromatic dicarboxylic acids and acid halide derivatives of aromatic dicarboxylic acids, with (2) a diamine selected from the group consisting of diprimary diamines, di-secondary diamines, and diamines having both a primary and a secondary amine group; and recovering a resinous product having a melting point in excess of about 400° C.

DESCRIPTION OF PREFERRED EMBODIMENTS

The coreactant which is condensed with a primary or secondary diamine to form a polyamide resin according to the present invention is aromatic in nature, and is selected from certain aromatic dicarboxylic acids, or the acid halide derivatives thereof. It is essential that the coreactant possess at least two non-aromatic unsaturated side chains. The unsaturated side chains contain at least one carbon to carbon double bond which is positioned in conjugation with the aromatic configuration. The double bond is formed by a pair of valence bonds which join a pair of carbon atoms. In a particularly preferred embodiment of the invention the coreactant has a pair of side chains each of which contain a double bond in conjugation with one or more aromatic ring. It has been found that when the coreactants are condensed with a diamine as discussed in detail hereafter, that polyamides of significantly enhanced melting points and insolubility in common solvents are produced. The mechanism whereby the polyamide condensation product is capable of exhibiting such properties is considered complex and incapable of simple explanation. However, it is believed that the presence of the carbon to carbon double bond in conjugation with the aromatic unsaturation of the benzene nucleus results in an extension of the resonance or ring conjugation present in the aromatic nucleus into the side chain, and imparts significantly modified physical properties to the resulting polymer.

The particularly preferred aromatic dicarboxylic acid for use in the formation of a polyamide resin in accordance with the present invention is 1,4-phenylene diacrylic acid. As is readily apparent from the following structural Formula A, this coreactant is provided with a pair of unsaturated side chains which are attached to a single benzene nucleus. Carbon to carbon double bonds which are in conjugation with the aromatic ring are present in each side chain.

(A) 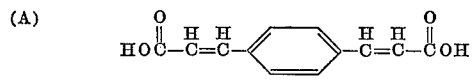

Additional aromatic dicarboxylic acids possessing an unsaturated side chain appended to an aromatic nucleus in which a carbon to carbon double bond is in conjugation with the nucleus will be apparent to those skilled in the art. Illustrative examples of coreactants possessing a plurality of aromatic nuclei are as follows;

(B) 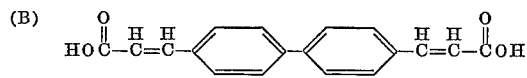

and (C) 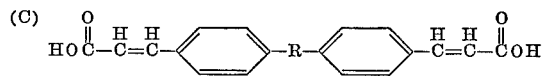

where R equals $CH_2$, O, S, $SO_2$,

or

Also, coreactants possessing side chains which include a plurality of adjoining saturated carbon to carbon bonds may be utilized provided at least one carbon to carbon double bond in each chain is positioned in conjugation with the aromatic configuration. Illustrative examples of such compounds are encompassed by the following general formula:

(D) 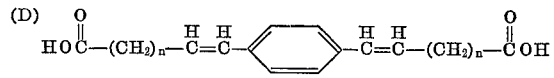

where $n$ is 1 to 5. In preferred embodiments of the invention the carbon to carbon unsaturation of the side chains are in conjugation with both the aromatic nucleus and the carboxylic acid group as in compounds (A), (B), and (C) set forth above.

In a preferred embodiment of the present invention the dicarboxylic acid coreactant is converted to its di-acid halide derivative prior to condensation with the primary or secondary diamine to form a polyamide resin. Such conversion may be conducted by techniques which are well known, such as by reaction with acid clorides of inorganic acids. Inorganic acid chlorides which may be used for this purpose include phosphorus trichloride, phosphorus oxychloride, phosphorous pentachloride, and thionyl chloride. During the reaction the hydroxyl portion of carboxyl group is replaced by a chlorine atom. Di-acid bromide and iodide derivatives, should they be desired, may be formed by the action of excess hydrogen bromide or hydrogen iodide upon the di-acid chlorides. The di-acid chloride is the particularly preferred di-acid halide derivative of the aromatic dicarboxylic acids. Thionyl chloride is a highly convenient reagent for the production of di-acid chlorides since the by-products of its reaction with the aromatic dicarboxylic acid are sulfur dioxide and hydrogen chloride which may be recovered as gases.

The diamines which are reacted with the coreactants heretofore described may be di-primary diamines, di-secondary diamines, or diamines having both a primary and a secondary amine group. The di-primary diamines may possess a general formula of $H_2N(CH_2)_nNH_2$ where $n$ equals 2 to about 10. Illustrative examples of such aliphatic di-primary diamines include: 1,2 - diaminoethane; 1,3 - diaminopropane; 1,4-diaminobutane; 1,5-diaminopentane; and 1,6 - diaminohexane (hexamethylene diamine). Suitable aromatic di-primary diamines include: 1,2 - diaminobenzene (ortho-phenylene diamine); 1,3 - daminobenzene (meta-phenylene diamine); 1,4- diamino benzene (para-phenylene diamine); toluene-2,4-diamine; toluene - 2,6 - diamine; 1,5 - naphthalene diamine; 1,8 - naphthalene diamine; 3,3' - dimethyl - 4,4'-biphenyldiamine; and 2,3,5,6-tetramethyl-para-phenylenediamine. Suitable cycloaliphatic di-primary diamines include: 1,4 - cyclohexanediamine; and 4,4'-methylenebis-cyclohexylamine. Suitable di-secondary diamines may possess a general formula of $R''NH(CH_2)_nNHR''$ where $n$ equals 2 to about 10, and where $R''$ is an alkyl, aryl, aralkyl, or cycloalkyl group. Heterocyclic diamines containing a di-secondary amine structure, such as piperazine, 2 - methyl piperazine, and 2,5-dimethyl piperazine may be utilized. Suitable diamines possessing both a primary and a secondary amine group may possess a general formula of $R''NH(CH_2)_nNH_2$ where $n$ equals 2 to about 10, and $R''$ is an alkyl, aryl, aralkyl, or cycloalkyl group. The preferred aliphatic di-primary amine is hexamethylene diamine. The preferred aromatic di-primary amine is meta-phenylene diamine. Polyamide resins formed according to the present invention which include aromatic diamine units tend to exhibit slightly higher melting points than those resins formed by the condensation of the coreactants heretofore defined with an aliphatic diamine.

The polyamide resins of the present invention are formed by combining approximately equimolar quantities of the aromatic dicarboxylic acid, or the acid halide derivative thereof, with a primary or secondary diamine under polymerization conditions in which a polycondensation reaction occurs. If the coreactant is an aromatic dicarboxylic acid, then water is produced as by-product of the condensation reaction. If the coreactant is an acid halide derivative of an aromatic dicarboxylic acid, then HCl, HBr or HI is produced as a by-product of the condensation reaction. If desired, stabilization techniques commonly utilized in the formation of polyamide resins may be employed.

Condensation of the acid halide derivative of the aromatic dicarboxylic acid with the diamine is utilized in a preferred embodiment of the invention. Such preference is founded upon the ease of polymer formation made possible through the use of this reaction technique. For instance, the polycondensation reaction employing the di-acid halide derivative may be conducted in the absence of a catalyst at room temperature, and at atmospheric pressure. The diamine may be dissolved in water, the di-acid halide derivative dissolved in a suitable anhydrous organic solvent, and the two solutions vigorously admixed. Preferred organic solvents for the di-acid halide derivative include: anhydrous benzene and anhydrous xylene. An organic or inorganic base is preferably added to preferentially neutralize the acid by-product formed during the reaction and to maintain the pH of the system above about 7 during the reaction. Illustrative examples of suitable inorganic acid scavengers for inclusion in the reaction system include: sodium hydroxide, sodium carbonate, magnesium oxide, and sodium bicarbonate. Illustrative examples of suitable acid scavengers of an organic nature include: pyridine, trimethylamine and triethylamine. The polycondensation reaction occurs interfacially as the immiscible solvents containing the dissolved reactants are intimately admixed. A white particulate polymer becomes apparent soon after admixture of the reactants. Agitation is preferably continued for 10 to about 30 minutes following the initial admixture of the reactants; however, longer reaction times may generally be employed, and do not adversely affect the properties of the polyamide product. The particulate product may be separated by filtration or centrifugation, washed, and dried.

As an alternate condensation procedure, the aromatic dicarboxylic acids and the diamines heretofore defined may be condensed directly without the necessity of initially forming the acid halide derivative of the acid. In such a condensation procedure the reactants are initially dissolved in a solvent, and a relatively low molecular weight condensation salt of the reactants is formed. For instance, the reactants may be dissolved in an organic solvent, such as methanol, in which the salt formed therein is compartively insoluble. The salt may be removed in a crystalline powder form by filtration or centrifugation from the reaction mixture. The crystalline salt next is further condensed to form a high melting polyamide resin by heating gradually to 285° C. in a slow stream of nitrogen and holding at 285° C. for 2 to 5 hours. Alternatively, the salt may be formed by reaction of the two components present in a water system. The aqueous solution may be subsequently concentrated to an approximately 40 to 70 percent by weight solids content in a vacuum evaporator, and transferred to an autoclave where further condensation is carried out, and a high melting polyamide resin produced.

The polyamide products formed according to the procedures heretofore described are believed to be largely linear in molecular configuration and possess melting points of at least about 400° C. upon heat treatment of the same in the presence of air a cross-linked polymer may optionally be produced. Such heat treatment may be conveniently conducted by heating the product in a conventional circulating air oven maintained at 150 to 200° C. for 1 to about 30 minutes. Alternatively, a cross-linked polymer may be produced by the application of ultraviolet light, or exposure to oxidizing agents, such as peroxides. The cross-linked product exhibits insolubility in all solvents, interactability, toughness, and increased heat stability properties which are not manifested by the polymer prior to heat treatment. It is believed that molecular cross-linking is made possible by the carbon to carbon double bond unsaturation present in the polymer.

The following examples are given as specific illustrations of the invention. It should be understood, however, that the invention is not limited to the specific details set forth in the examples.

EXAMPLE I

Solution A is formed by dissolving with agitation 4.1 parts by weight of the di-acid chloride derivative of 1,4-phenylene diacrylic acid, i.e. 1,4-phenylene diacrylyl chloride, in approximately 200 parts by weight of anhydrous benzene. Solution B is formed by dissolving with agitation 1.8 parts by weight of hexamethylene diamine in approximately 100 parts by weight of distilled water which has been deoxygenated by boiling and subsequently cooling under a nitrogen atmosphere. 1.9 parts by weight of sodium carbonate are next dissolved in solution B, and solution B while at room temperature is placed in a stainless steel reactor provided with a central agitator capable of producing vigorous agitation. Agitation of the contents of the reactor is commenced and solution A while also at room temperature is added to solution B through a port in the head of the reactor. The formation of a white particulate polymeric product immediately becomes apparent. Agitation of the contents of the reactor is continued for 20 minutes, while the polycondensation reaction is allowed to continue. Agitation of the contents of the reaction is discontinued, and the pH of the aqueous phase is determined to be 7 to 7.5. The product is separated by filtration, washed with distilled water and subsequently with methanol, and allowed to dry for 48 hours in a conventional drying chamber maintained at 50° C. while under reduced pressure. 4.5 parts by weight of the dry particulate polyamide product are recovered.

The polymer product obtained by the condensation of the di-acid chloride derivative of 1,4-phenylene diacrylic acid and hexamethylene diamine is insoluble in common organic solvents including cresol, and possesses a melting point in excess of 400° C., with only relatively slight decomposition thereof while being maintained at the elevated temperature of 400° C. The inherent viscosity of the sample as measured in a 97 percent sulfuric acid solution is 0.80.

For comparative purposes Example I may be repeated in which the saturated homolog of 1,4-phenylene diacrylic acid is utilized as the coreactant. More specifically, the di-acid chloride derivative of phenylene dipropionic acid may be condensed with hexamethylene as described above, and the polyamide product recovered. The inherent viscosity of the product formed utilizing the saturated homolog is identical to that obtained in the preceding example. A marked difference in the physical properties of this polymer is readily apparent, however, when a comparison is made with the properties of polyamide formed according to the present invention. For instance, a polyamide formed from the saturated homolog is soluble in common organic solvents, such as cresol, and melts at the significantly lower temperature of approximately 310° C.

EXAMPLE II

Solution A is formed as described in Example I. Solution B is formed by dissolving 1.7 parts by weight of meta-phenylene diamine in approximately 100 parts by weight of distilled water which has been deoxygenated by boiling and subsequently cooling under a nitrogen atmosphere. 1.9 parts by weight of sodium carbonate are next dissolved in solution B, and solution B while at room temperature is placed in a stainless steel reactor provided with a central agitator capable of producing vigorous agitation. The polymerization, product recovery, and drying procedures of Example I are repeated and 4.5 parts by weight of dry particulate polyamide product are recovered. The product possesses an inherent viscosity of 0.3 when measured in a 97 percent sulfuric acid solution. The product is insoluble in the usual nylon solvents and has a melting point in excess of 400° C., with only relatively slight decomposition thereof while being maintained at the elevated temperature of 400° C.

When the Example II is repeated while substituting the di-acid chloride derivative of phenylene dipropionic acid for the di-acid chloride derivative of 1,4-phenylene diacrylic acid, a product of significantly lesser heat resistance is formed. The product formed has an inherent viscosity of 0.4 when measured in a 97 percent sulfuric acid solution and a melting point of 285–290° C. Also, the product is soluble in metacresol while the product formed according to Example II is insoluble therein.

EXAMPLE III

Equimolar quantities of 1,4-phenylene diacrylic acid and metaphenylene diamine are dissolved in methanol and a relatively low molecular weight condensation salt is allowed to form, which is removed by filtration. The particulate crystalline salt is transferred to a reaction vessel and flushed with nitrogen. The salt is then heated to 255° C. at atmospheric pressure under a slight nitrogen flow. The reaction temperature is raised to 285° C. and held for one-half hour while at atmospheric pressure. The reaction is next completed by continuing to heat at 285° C. under approximately 2 mm. of Hg for 2½ hours. A polyamide product essentially identical to that formed in Example II is recovered.

The high melting polymers of the present invention are particularly suited for use in applications where a heat resistant article is required. For instance, the polymers may be utilized as a vehicle or binder in the formation of high temperature composites. Also, the polymers may be used to produce high performance fibers, which if desired may also serve as precursors for carbon or graphite fibers.

Although the invention has been described with preferred embodiments, it will be understood that variations and modifications may be resorted to as will be apparent to those skilled in the art. Such variations and modifications are to be considered within the purview and scope of the claims appended hereto.

I claim:

1. A polyamide resin consisting essentially of the polymeric product formed by condensing approximately equimolar quantities of a coreactant phenylene bis acrylic acid or its acid halide derivative with a diamine selected from the group consisting of (1) di-primary diamines possessing the general formula of $H_2N(CH_2)_nNH_2$ when $n$ equals about 2 to 10 and (2) phenylene diamine; and recovering a resinous product having a melting point in excess of about 400° C.

2. A polyamide resin according to claim 1 wherein: said acid halide derivative is 1,4-phenylene diacrylic acid chloride and said diamine is hexamethylene diamine.

3. A polyamide resin according to claim 1 wherein: said acid halide derivative is 1,4-phenylene diacrylic acid chloride and said diamine is meta-phenylene diamine.

References Cited

UNITED STATES PATENTS

| | | | |
|---|---|---|---|
| 2,174,619 | 10/1939 | Carothers | 260—78 |
| 2,657,195 | 10/1953 | Toland | 260—78 |
| 2,997,391 | 8/1961 | Murray et al. | 260—78 |
| 3,023,100 | 2/1962 | Thoma | 260—78 |

HAROLD D. ANDERSON, Primary Examiner

U.S. Cl. X.R.

260—30.8, 47, 65